US012263677B2

(12) United States Patent
Arakane et al.

(10) Patent No.: US 12,263,677 B2
(45) Date of Patent: *Apr. 1, 2025

(54) LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

(71) Applicant: Brother Kogyo Kabushiki Kaisha, Nagoya (JP)

(72) Inventors: Satoru Arakane, Nagoya (JP); Tomoya Kondo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 27 days.

This patent is subject to a terminal disclaimer.

(21) Appl. No.: 18/326,650

(22) Filed: May 31, 2023

(65) Prior Publication Data

US 2023/0321976 A1 Oct. 12, 2023

Related U.S. Application Data

(63) Continuation of application No. 17/412,825, filed on Aug. 26, 2021, now Pat. No. 11,701,881.

(30) Foreign Application Priority Data

Sep. 2, 2020 (JP) ................................ 2020-147613

(51) Int. Cl.
*B41J 2/045* (2006.01)
*B41J 3/60* (2006.01)

(52) U.S. Cl.
CPC ....... *B41J 2/04573* (2013.01); *B41J 2/04541* (2013.01); *B41J 2/04581* (2013.01); *B41J 3/60* (2013.01)

(58) Field of Classification Search
CPC ........................................................ B41J 3/60
See application file for complete search history.

(56) References Cited

U.S. PATENT DOCUMENTS 5,742,301 A 4/1998 Ikeda
6,578,944 B1 6/2003 Kamei et al.
(Continued)

FOREIGN PATENT DOCUMENTS

JP H11-179894 A 7/1999
JP 2002036528 A 2/2002
(Continued)

OTHER PUBLICATIONS

Feb. 6, 2024—(JP) Notice of Reasons for Refusal—JP App 2020-147613, Eng Tran.

*Primary Examiner* — Shelby L Fidler
(74) *Attorney, Agent, or Firm* — Banner & Witcoff, Ltd.

(57) ABSTRACT

A liquid discharging apparatus includes: a channel unit having a nozzle and an individual channel; an actuator applying pressure to liquid in the individual channel to discharge the liquid from the nozzle; a driving circuit electrically connected to the actuator and supplying driving signal to the actuator; and a controller. In a case of determining that a single-sided recording is to be executed, the controller supplies the driving signal corresponding to each of gradation values for each of pixels when discharging the liquid toward one of a first surface and a second surface of a recording medium; in a case of determining that the double-sided recording is to be executed, the controller supplies the driving signal corresponding to each of the gradation values for each of the pixels when discharging the liquid toward the first surface and when discharging the liquid toward the second surface.

7 Claims, 12 Drawing Sheets

(56) References Cited

U.S. PATENT DOCUMENTS

| | | | | |
|---|---|---|---|---|
| 11,701,881 | B2 * | 7/2023 | Arakane | B41J 3/60 347/14 |
| 2004/0100516 | A1 | 5/2004 | Nagoshi | |
| 2005/0116974 | A1 | 6/2005 | Suzuki | |
| 2008/0012894 | A1 | 1/2008 | Ono | |
| 2009/0147034 | A1 | 6/2009 | Yoshida | |
| 2010/0033757 | A1 | 2/2010 | Saito | |
| 2014/0268241 | A1 | 9/2014 | Kakutani et al. | |
| 2019/0299651 | A1 | 10/2019 | Fujita | |
| 2021/0376836 | A1 | 12/2021 | Sekiya et al. | |

FOREIGN PATENT DOCUMENTS

| | | | |
|---|---|---|---|
| JP | 2005-153378 | A | 6/2005 |
| JP | 2005324459 | A | 11/2005 |
| JP | 2007160805 | A | 6/2007 |
| JP | 2008018664 | A | 1/2008 |
| JP | 2010039976 | A | 2/2010 |
| JP | 2013-184447 | A | 9/2013 |
| JP | 2014176968 | A | 9/2014 |
| JP | 2019155762 | A | 9/2019 |
| JP | 2019171644 | A | 10/2019 |
| WO | 2020/013101 | A1 | 1/2020 |

* cited by examiner

CONVEYING DIRECTION

FIG. 6

| | WAVEFORM SIGNAL FIRE (WAVEFORM DATA) | | | | SELECTION SIGNAL SIN (GRADATION DATA) |
|---|---|---|---|---|---|
| | DRIVING SIGNAL GROUP A | | DRIVING SIGNAL GROUP B | | |
| ZERO | F0 (0pl) | 000 | F0 (0pl) | 000 | 00 |
| SMALL | F1 (5pl) | 001 | F1 (5pl) | 001 | 01 |
| MEDIUM | F2 (15pl) | 010 | F2’ (10pl) | 101 | 10 |
| LARGE | F3 (30pl) | 011 | F3’ (15pl) | 111 | 11 |

FIG. 9

| IMAGE QUALITY MODE | SINGLE-SIDED/ DOUBLE-SIDED | BARCODE/ NON-BARCODE | DISCHARGE MODE | DRIVING SIGNAL GROUP |
|---|---|---|---|---|
| NORMAL | - | - | - | A |
| HIGH IMAGE QUALITY | SINGLE-SIDED | NON-BARCODE | NORMAL | A |
| HIGH IMAGE QUALITY | SINGLE-SIDED | NON-BARCODE | REDUCED | B |
| HIGH IMAGE QUALITY | SINGLE-SIDED | BAR CODE | - | B |
| HIGH IMAGE QUALITY | DOUBLE-SIDED | - | - | B |

LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

REFERENCE TO RELATED APPLICATIONS

The present application is a continuation of U.S. patent application Ser. No. 17/412,825 filed on Aug. 26, 2021, which claims priority from Japanese Patent Application No. 2020-147613, filed on Sep. 2, 2020, the disclosures of which are incorporated herein by reference in their entirety.

BACKGROUND ART

The present disclosure relates to a liquid discharging apparatus which controls a liquid droplet amount of liquid, for each pixel, corresponding to at least three gradation values, and a controlling method for controlling the liquid discharging apparatus and a medium storing a controlling program for the liquid discharging apparatus.

DESCRIPTION OF THE RELATED ART

An ink-jet recording apparatus (liquid discharging apparatus) described in Japanese Patent Application Laid-open No. 2013-184447 is configured to be capable of controlling a liquid droplet amount of ink to be discharged from each of nozzles.

DESCRIPTION

Summary

There is such a case that a liquid discharging apparatus selectively executes a single-sided recording of recording an image on one surface of a recording medium, and a double-sided recording of recording an image or images on both surfaces of the recording medium. In such a situation, in a case that the double-sided recording is executed (at the time of the double-sided recording), if liquid is discharged with respect to each of the surfaces of the recording medium, in accordance with a gradation value, in a liquid droplet amount which is same as that of a case of executing the single-sided recording (at the time of the single-sided recording), a total discharge amount of the liquid discharged with respect to the recording medium becomes large, which in turn might cause a bleed-through (a phenomenon in which a liquid landed on a first surface of the recording medium bleeds up to a second surface of the recording medium). Further, in a case that, for the purpose of preventing the bleed-through, a liquid droplet amount corresponding to a gradation value with respect to each of the surfaces at the time of the double-sided recording is made small, and that the liquid is discharged to one surface of the recording medium in accordance with the gradation value at the time of the single-sided recording, in a liquid droplet amount which is same as the liquid droplet amount with respect to each of the surfaces at the time of the double-sided recording, the color development might be deteriorated due to a small liquid droplet amount.

An object of the present disclosure is to provide a liquid discharging apparatus capable of suppressing both of any occurrence of the bleed-through at the time of the double-sided recording and any degradation of the color development at the time of the single-sided recording, a controlling method for the liquid discharging apparatus and a medium storing a controlling program for the liquid discharging apparatus.

According to a first aspect of the present disclosure, there is provided a liquid discharging apparatus including: a channel unit in which a nozzle and an individual channel communicating with the nozzle are formed; an actuator configured to apply pressure to liquid in the individual channel to discharge the liquid from the nozzle; a driving circuit electrically connected to the actuator and configured to supply driving signal to the actuator; and a controller, wherein in a first determining processing, in a case of determining that a single-sided recording is to be executed, the controller is configured to supply the driving signal corresponding to each of gradation values for each of pixels to the actuator by the driving circuit at a time of discharging the liquid from the nozzle toward one of a first surface and a second surface of a recording medium, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium, in a case of determining in the first determining processing that the double-sided recording is to be executed, the controller is configured to supply the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording, and a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value.

According to a second aspect of the present disclosure, there is provided a controlling method for controlling a liquid discharging apparatus including: a channel unit in which a nozzle and an individual channel communicating with the nozzle are formed; an actuator configured to apply pressure to liquid in the individual channel to discharge the liquid from the nozzle; and a driving circuit electrically connected to the actuator and configured to supply driving signal to the actuator, the controlling method comprising: in a first determining processing, in a case of determining that a single-sided recording is to be executed, supplying the driving signal corresponding to each of gradation values for each of pixels to the actuator by the driving circuit at a time of discharging the liquid from the nozzle toward one of a first surface and a second surface of a recording medium, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium; and in a case of determining in the first determining processing that the double-sided recording is to be executed, supplying the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, wherein the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording, and a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value.

According to a third aspect of the present disclosure, there is provided a non-transitory medium storing a program for controlling a liquid discharging apparatus including: a channel unit in which a nozzle and an individual channel communicating with the nozzle are formed; an actuator configured to apply pressure to liquid in the individual channel to discharge the liquid from the nozzle; a driving circuit electrically connected to the actuator and configured to supply driving signal to the actuator, and a controller, in a case that the program is executed by the controller, the program causing the liquid discharging apparatus to execute: a single-sided recording processing of supplying the driving signal corresponding to each of gradation values for each of pixels to the actuator by the driving circuit at a time of discharging the liquid from the nozzle toward one of a first surface and a second surface of a recording medium, in a case of determining, in a first determining processing, that a single-sided recording is to be executed, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium; and a double-sided recording processing of supplying the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, in a case of determining, in the first determining processing, that the double-sided recording is to be executed, wherein the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording; and a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value.

According to the present disclosure, at the time of the double-sided recording, the liquid is discharged with respect to each of the first surface and the second surface of the recording medium in accordance with the gradation value, in the liquid droplet amount which is smaller than that at the time of the single-sided recording, rather than the liquid droplet amount which is same as that at the time of the single-sided recording. With this, it is possible to suppress the bleed-through at the time of the double-sided recording. Further, at the time of the single-sided recording, the liquid is discharged, in accordance with the gradation value with respect to the one surface of the recording medium, in the liquid droplet amount which is not same as, but is rather greater than the liquid droplet amount with respect to each of the surfaces of the recording medium at the time of the double-sided recording. With this, it is possible to suppress the degradation of the color development at the time of the single-sided recording.

BRIEF DESCRIPTION OF THE DRAWINGS

FIG. 6 is a table for explaining each of data of the waveform signal FIRE and data of a selection signal SIN.

FIG. 9 is a table indicating driving signal groups which are selected depending on an image quality mode, a single-sided or double-sided recording, a barcode or non-barcode recording and a discharge mode.

DETAILED DESCRIPTION

First Embodiment

First, the overall configuration of a printer 100 according to a first embodiment of the present disclosure and the configuration of respective parts of the printer 100 will be explained, with reference to FIGS. 1 to 3.

Figure 1:
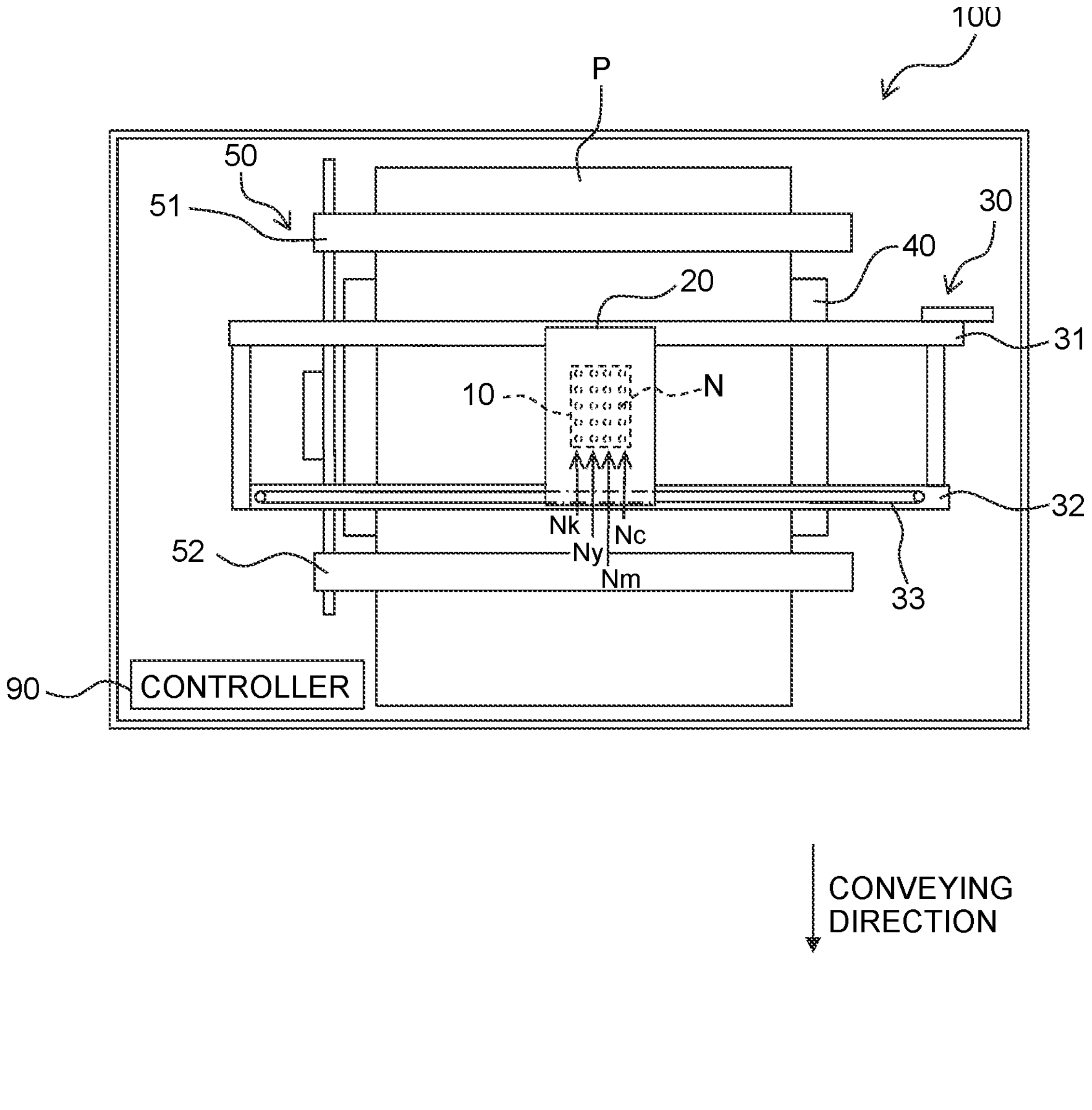
FIG. 1 is a plan view depicting the overall configuration of a printer according to a first embodiment of the present disclosure.

As depicted in FIG. 1, the printer 100 is provided with: a head 10 having a plurality of nozzles N formed in a lower surface thereof, a carriage 20 holding the head 10; a scanning mechanism 30 moving the carriage 20 and the head 10 in a scanning direction (a direction orthogonal to the vertical direction); a platen 40 supporting a paper sheet (paper) P (recording medium) from therebelow; a conveyer 50 conveying the paper sheet P in a conveying direction (a direction orthogonal to the scanning direction and the vertical direction); and a controller 90.

The plurality of nozzles N construct four nozzle rows (nozzle arrays) Nc, Nm, Ny and Nk arranged side by side in the scanning direction. Each of the nozzle rows Nc, Nm, Ny and Nk is constructed of nozzles N, among the plurality of nozzles N, arranged side by side in the conveying direction. The nozzles N constructing the nozzle row Nc discharge a cyan ink, the nozzles N constructing the nozzle row Nm discharge a magenta ink; the nozzles N constructing the nozzle row Ny discharge an yellow ink, and the nozzles N constructing the nozzle row Nk discharge a black ink.

The scanning mechanism 30 includes a pair of guides 31 and 32 supporting the carriage 20, and a belt 33 connected to the carriage 20. The pair of guides 31 and 32 and the belt 33 extend in the scanning direction. In a case that a carriage motor 30*m* (see FIG. 3) is driven by control of the controller 90, the belt 33 runs, thereby causing the carriage 20 and the head 10 to move in the scanning direction along the pair of guides 31 and 32.

The platen 40 is arranged at a location below the carriage 20 and the head 10. The paper sheet P is supported by an upper surface of the platen 40.

The conveyer 50 has two roller pairs 51 and 52. In the conveying direction, the head 10, the carriage 20 and the platen 40 are arranged between the roller pair 51 and the roller pair 52. In a case that a conveying motor 50*m* (see FIG. 3) is driven by the control of the controller 90, the roller pairs 51 and 52 rotate in a state that the paper sheet P is pinched therebetween, thereby conveying the paper sheet P in the conveying direction.

Figure 2:
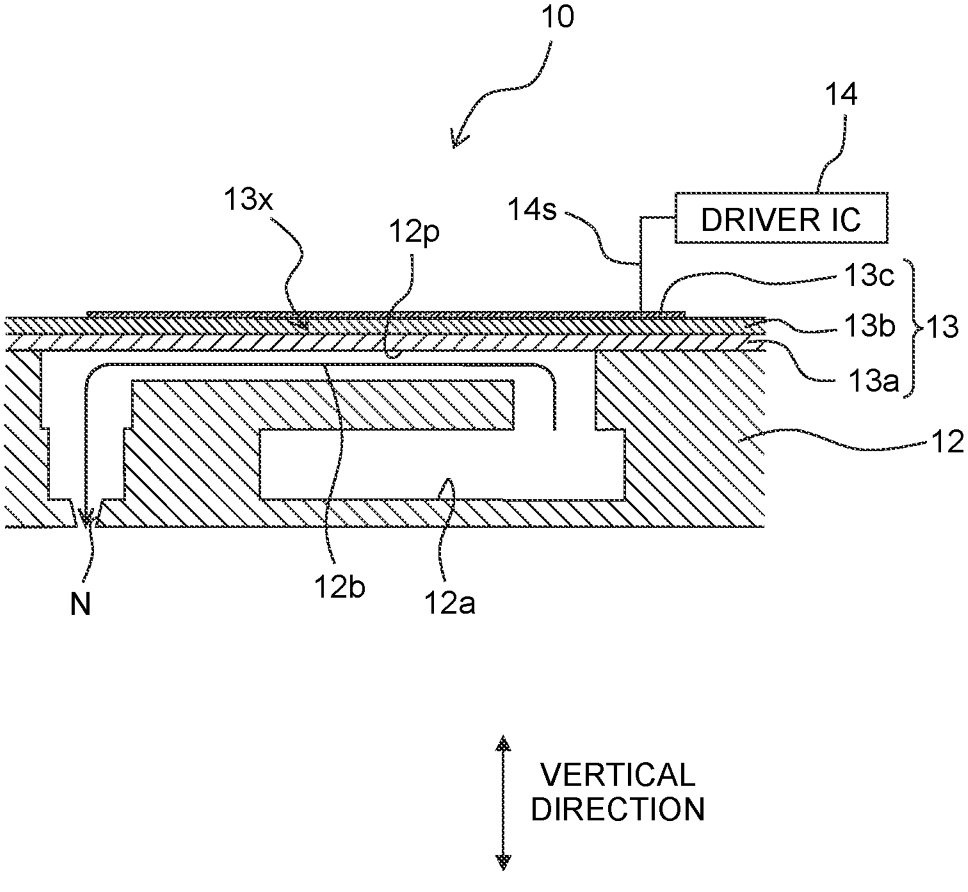
FIG. 2 is a cross-sectional view of a head depicted in FIG. 1.

As depicted in FIG. 2, the head 10 includes a channel unit 12 and an actuator unit 13.

The plurality of nozzles N (see FIG. 1) are formed in a lower surface of the channel unit 12. A common channel 12*a* communicating with an ink tank (not depicted in the drawings) and a plurality of individual channels 12*b* each of which communicates with one of the plurality of nozzles N are formed in the channel unit 12. Each of the plurality of individual channels 12*b* is a channel from an outlet of the common channel 12*a* and reaching one of the plurality of nozzles N via a pressure chamber 12*p*. A plurality of pieces of the pressure chamber 12*p* are opened in an upper surface of the channel unit 12.

The actuator unit 13 includes a metallic vibration plate 13*a* arranged on the upper surface of the channel unit 12 so as to cover the plurality of pressure chambers 12*p*, a piezoelectric layer 13*b* arranged on an upper surface of the vibration plate 13*a*, and a plurality of individual electrodes 13*c* each of which is arranged on an upper surface of the piezoelectric layer 13*b* so as to face one of the plurality of pressure chambers 12*p*.

The vibration plate 13*a* and the plurality of individual electrodes 13*c* are electrically connected to a driver IC 14. The driver IC 14 maintains the potential of the vibration plate 13 at the ground potential, whereas the driver IC 14 changes the potential of each of the plurality of individual electrodes 13*c*. Specifically, the driver IC 14 generates a driving signal based on a control signal (a waveform signal FIRE and a selection signal SIN) from the controller 90, and supplies the driving signal to each of the plurality of individual electrodes 13*c* via a signal line 14*s*. With this, the potential of the individual electrode 13*c* is changed between a predetermined driving potential (VDD) and the ground potential (0V) (see FIGS. 4A to 4D and FIGS. 5A to 5D). In this situation, parts (actuator 13*x*) of the vibration plate 13*a* and the piezoelectric layer 13*b*, respectively, which are sandwiched between each of the plurality of individual electrodes 13*c* and one of the pressure chambers 12*p* corresponding thereto are deformed, thereby changing the volume of the pressure chamber 12*p*. As a result, pressure is applied to the ink in the pressure chamber 12*p*, thereby discharging the ink from the nozzle N. The actuator 13*x* is provided as a plurality of actuators 13*x* each of which is provided on one of the plurality of individual electrodes 13*c* (namely, on one of the plurality of nozzles N); each of the plurality of actuators 13*x* is deformable independently in accordance with the potential supplied to each of the plurality of individual electrodes 13*c*.

Figure 3:
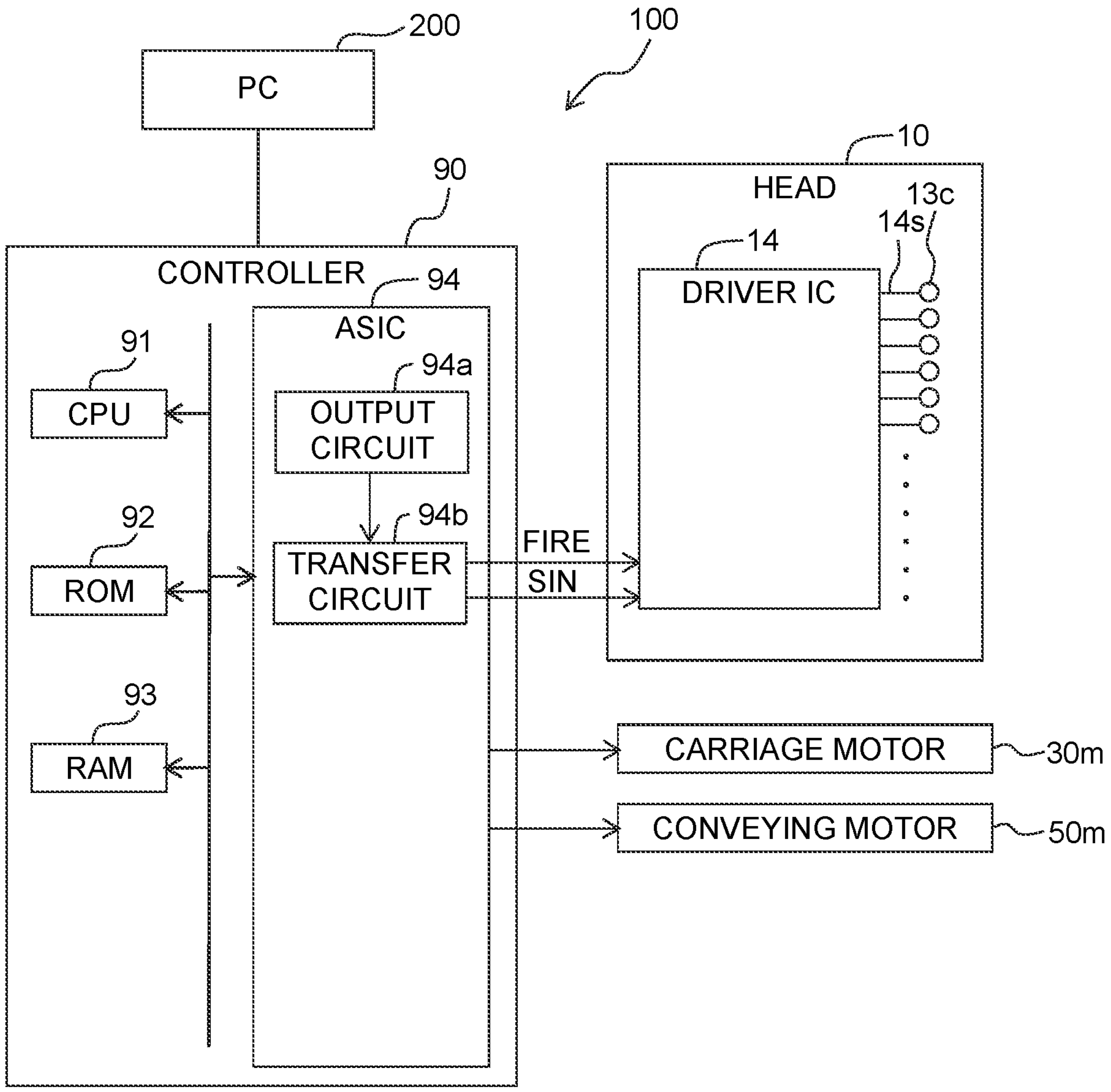
FIG. 3 is a block diagram depicting the electrical configuration of the printer of FIG. 1.

As depicted in FIG. 3, the controller 90 includes a CPU (Central Processing Unit) 91, a ROM (Read Only Memory) 92, a RAM (Random Access Memory) 93 and an ASIC (Application Specific Integrated Circuit) 94. Among the above-described elements, the CPU 91 and the ASIC 94 correspond to a “controller” of the present disclosure.

A program and data for allowing the CPU 91 and/or the ASIC 94 to perform a variety of kinds of control are stored in the ROM 92. The RAM 93 temporarily stores data which is used by the CPU 91 and/or the ASIC 94 in a case of executing a program. The controller 90 is connected to a PC (personal computer) 200 so that the controller 90 is capable of communicating with the PC 200, and executes a recording processing, with the CPU 91 and/or the ASIC 94, based on data received from the PC 200. The PC 200 corresponds to an “external apparatus” of the present disclosure.

In the recording processing, the ASIC 94 drives the driver IC 14, the carriage motor 30*m* and the conveying motor 50*m*, by following an instruction from the CPU 91 and based on data received from the PC 200. With this, a conveying operation of causing the conveyer 50 to convey the paper sheet P in a predetermined amount in the conveying direction, and a scanning operation of discharging the ink(s) from the nozzles N while moving the carriage 20 and the head 10 in the scanning direction are alternately performed. As a result, dots of the ink(s) are formed on the paper sheet P, and an image is recorded on the paper sheet P.

As depicted in FIG. 3, the ASIC 94 includes an output circuit 94*a* and a transfer circuit 94*b*.

The output circuit 94*a* generates the waveform signal FIRE and the selection signal SIN, and outputs these signals FIRE and SIN to the transfer circuit 94*a* for every recording cycle T. One piece of the recording cycle T is a time required for the paper sheet P to move relative to the head 10 only by a unit distance corresponding to the resolution of an image to be formed on the paper sheet P, and one piece of the recording cycle T corresponds to one pixel (picture element).

The waveform signal FIRE is a serial signal in which four pieces of waveform data F0, F1, F2 and F3 (see FIGS. 4A to 4D) are arranged in series, or a serial signal in which four pieces of waveform data F0, F1, F2' and F3' (see FIGS. 5A to 5D) are arranged in series. The waveform data F0, F1, F2 and F3 correspond to a driving signal group A, and the waveform data F0, F1', F2' and F3' correspond to a driving signal group B. Namely, the waveform signal FIRE includes the driving signal group A which is composed of four (at least three) pieces of the waveform data F0, F1, F2 and F3 and the driving signal group B which is composed of four (at least three) pieces of the waveform data F0, F1, F2' and F3'.

The waveform data F0 (see FIG. 4A and FIG. 5A) corresponds to a liquid droplet amount, of the ink to be discharged from the nozzle N within one piece of the recording cycle T (one recording cycle T: time from a point of time t0 to a point of time t1), which is "0 (zero; no discharge)", and maintains the potential of the individual electrode 13*c* to the ground potential (0V). The waveform data F1 (see FIG. 4B and FIG. 5B) corresponds to a liquid droplet amount, of the ink to be discharged from the nozzle N within the one recording cycle T, which is "small". The waveform data F1 includes one pulse changing the potential of the individual electrode 13*c* between the ground potential (0V) and the driving potential (VDD), and causes one droplet of the ink to be discharged from the nozzle N. The waveform data F2, F2' (see FIG. 4C and FIG. 5C) corresponds to a liquid droplet amount, of the ink to be discharged from the nozzle N within the one recording cycle T, which is "medium". The waveform data F2, F2' includes two pulses changing the potential of the individual electrode 13*c* between the ground potential (0V) and the driving potential (VDD), and causes two droplets of the ink to be discharged from the nozzle N. The waveform data F3, F3' (see FIG. 4D and FIG. 5D) corresponds to a liquid droplet amount, of the ink to be discharged from the nozzle N within the one recording cycle T, which is "large". The waveform data F3, F3' includes four pulses changing the potential of the individual electrode 13*c* between the ground potential (0V) and the driving potential (VDD), and causes four droplets of the ink to be discharged from the nozzle N.

Figure 4A:
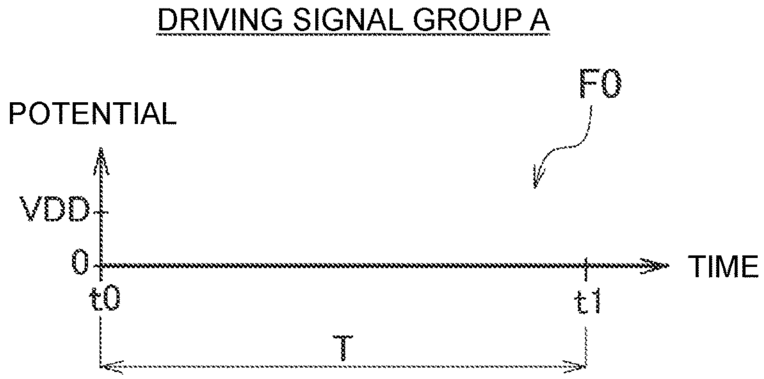
FIGS. 4A to 4D are waveform charts indicating four kinds of waveform data included in a waveform signal FIRE corresponding to a driving signal group A.
Figure 4B:
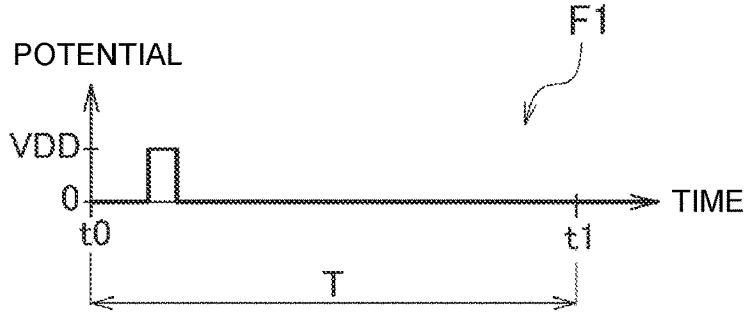
Figure 4C:
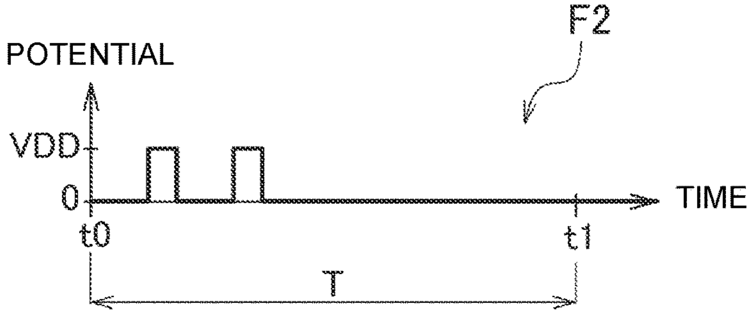
Figure 4D:
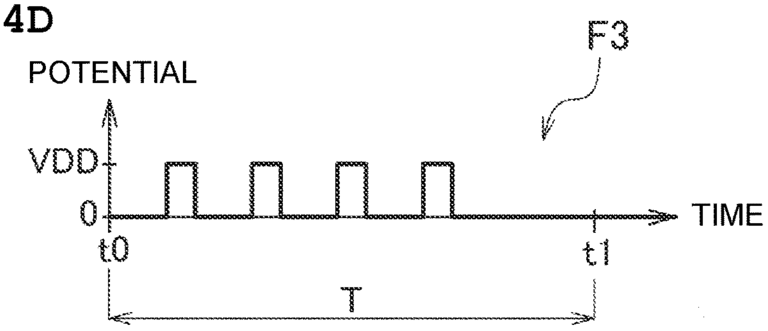
Figure 5A:
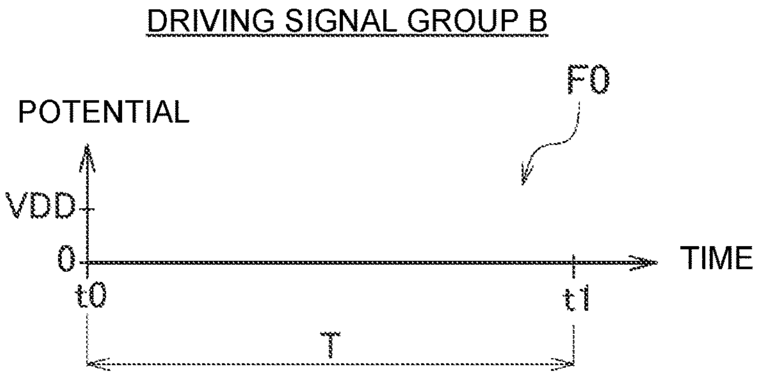
FIGS. 5A to 5D are waveform charts indicating four kinds of waveform data included in a waveform signal FIRE corresponding to a driving signal group B.
Figure 5B:
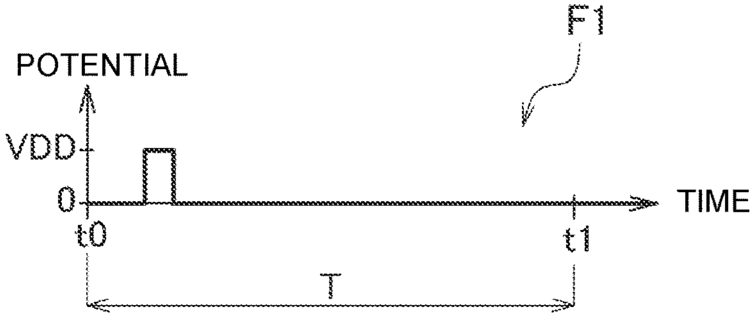
Figure 5C:
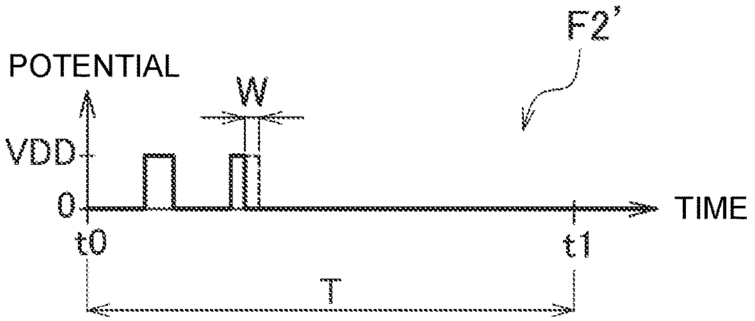
Figure 5D:
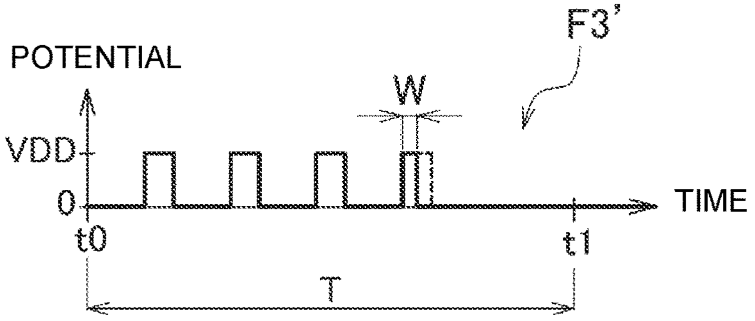

The difference between the waveform data F2 and the waveform data F3 depicted in FIGS. 4C and 4D, respectively, and the waveform data F2' and the waveform data F3' depicted in FIGS. 5C and 5D, respectively, is the width of a final pulse. Widths W of the final pulses of the waveform data F2' and the waveform data F3' are approximately ½ of the respective widths W of the final pulses of the waveform data F2 and the waveform data F3. Due to the smallness of the width W of the final pulse, the waveform data F2' and the waveform data F3' correspond to liquid droplet amounts smaller than the respective liquid droplet amounts of the waveform data F2 and the waveform data F3.

Specifically, as depicted in FIG. 6, the waveform data F0 corresponds to a liquid droplet amount of 0 (zero) pl, the waveform data F1 corresponds to a liquid droplet amount of 5 (five) pl, the waveform data F2 corresponds to a liquid droplet amount of 15 (fifteen) pl, the waveform data F3 corresponds to a liquid droplet amount of 30 (thirty) pl, the waveform data F2' corresponds to a liquid droplet amount of 10 (ten) pl, and the waveform data F3' corresponds to a liquid droplet amount of 15 (fifteen) pl.

The selection signal SIN is a serial signal including gradation data for selecting one waveform data among the four pieces of the waveform data F0, F1, F2 and F3 or among the four pieces of the waveform data F0, F1, F2' and F3'. The selection signal SIN is generated for each of the actuators 13*x* and for each recording cycle T based on the image data included in the recording instruction.

As depicted in FIG. 6, each of the waveform data F0, F1, F2, F3, F2' and F3' of the waveform signal FIRE is constructed of 3 bits ("000", "001", etc.). Each of the gradation data of the selection signal SIN is constructed of 2 bits ("00", "01", "10", "11").

The transfer circuit 94*b* transfers the waveform signal FIRE and the selection signal SIN received from the output circuit 94*a* to the driver IC 14. The transfer circuit 94*b* has a LVDS (Low Voltage Differential Signaling) driver installed therein and corresponding to each of the signals FIRE and SIN, and transfers each of the signals FIRE and SIN to the driver IC 14, as a pulse-shaped differential signal.

The ASIC 94 controls the driver IC 14 in the recording processing, generates the driving signal based on the waveform signal FIRE and the selection signal SIN for each pixel, and supplies the driving signal to each of the plurality of individual electrodes 13*c* via the signal line 14*s*. With this, the ASIC 94 discharges, for each pixel, the ink of which droplet amount is selected from the four kinds of liquid droplet amounts (zero, small, medium and large) from each of the plurality of nozzles N, toward the paper sheet P.

As described above, in the present embodiment, the number of the gradation values is "4 (four)" (four kinds of liquid droplet amounts: zero, small, medium and large). The gradation data of the selection signal SIN ("00", "01", "10" and "11" indicated in FIG. 6) indicate the respective gradation values (zero, small, medium and large). In the recording processing, each of the driving signals which corresponds to one of the gradation values (zero, small, medium and large) is supplied by the driver IC 14 to one of the individual electrodes 13*c*, for each of the pixels.

In the driving signal group A and the driving signal group B, the waveform data F0 of "zero" is same and the waveform data F1 of "small" (a third gradation value: smallest gradation value) is same. Namely, the waveform data F1 of "small" is waveform data corresponding to a smallest gradation value of which liquid droplet amount is not 0 (zero) and is the smallest among the four gradation values of "zero", "small", "medium" and "large". In the driving signal group A and the driving signal group B, the waveform data F2 and the waveform data F2', each of which is of "medium" (a second gradation value) are different from each other, wherein the waveform data F2' corresponds to a liquid droplet amount smaller than a liquid droplet amount of the waveform data F2. In the driving signal group A and the driving signal group B, the waveform data F3 and the waveform data F3', each of which is of "large (a first gradation value, a fourth gradation value, a fifth gradation value) are different from each other, wherein the waveform data F3' corresponds to a liquid droplet amount smaller than a liquid droplet amount of the waveform data F3.

Next, the recording processing will be explained, with reference to FIGS. 7 and 8.

Figure 7A:
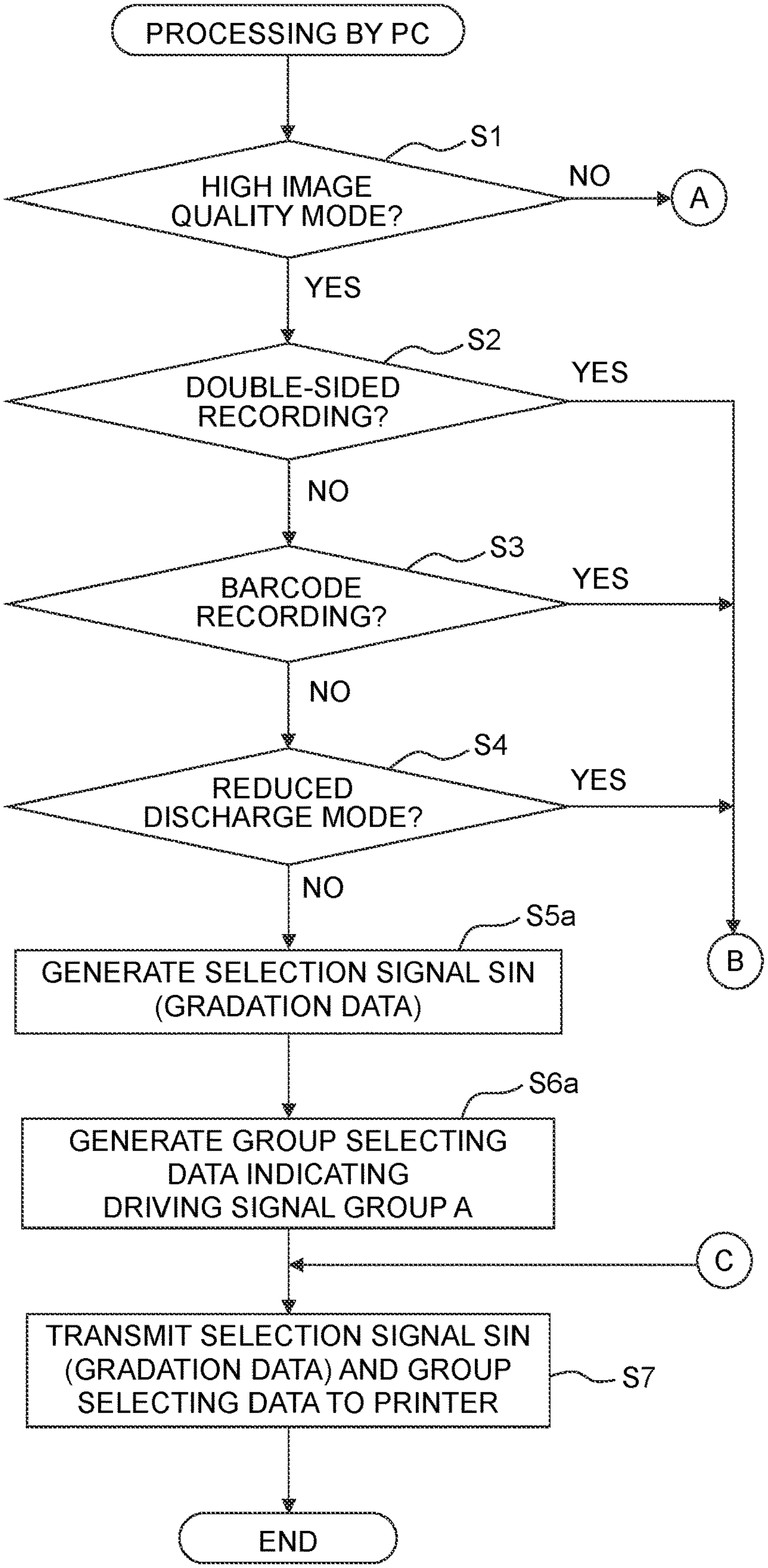
FIGS. 7A and 7B are a flow chart indicating a processing executed by a PC which is connected to the printer of FIG. 1 so that the PC is capable of communicating with the printer.
Figure 7B:
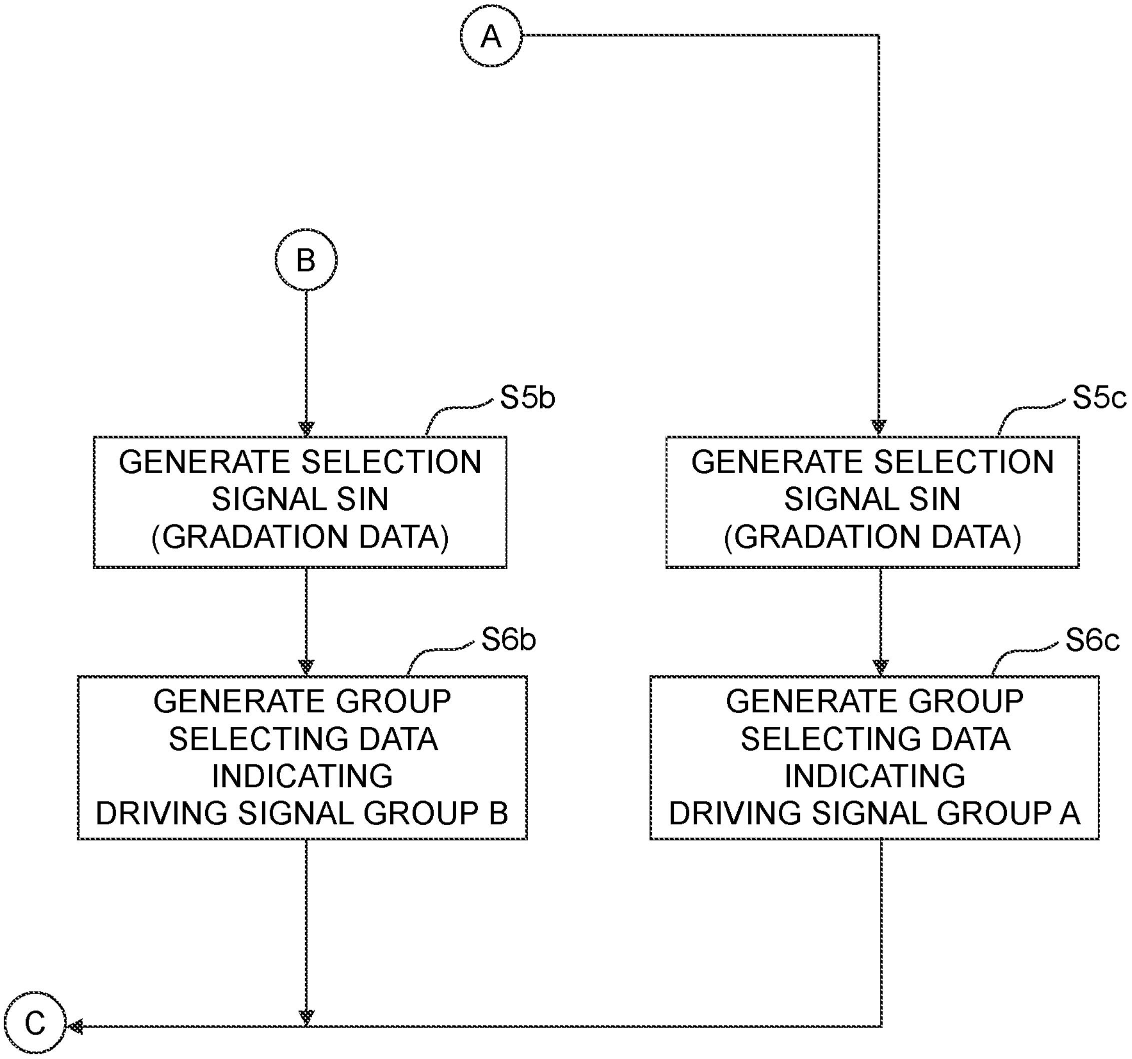
Figure 8:
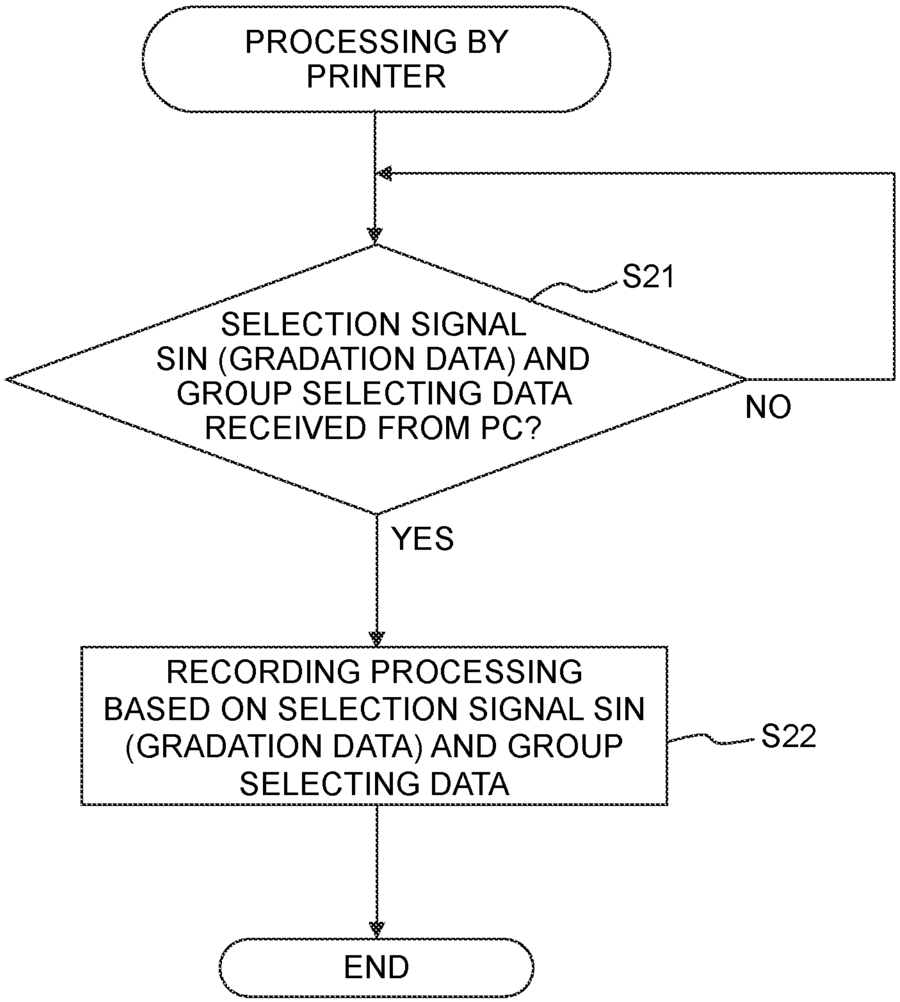
FIG. 8 is a flow chart indicating a processing executed by a CPU of the printer of FIG. 1.

In the present embodiment, the processing is firstly performed on the side of the PC 200 as depicted in FIGS. 7A and 7B, and then the processing is performed on the side of the printer 100 as depicted in FIG. 8. The processing depicted in FIG. 8 is execute by the CPU 91.

As depicted in FIGS. 7A and 7B, in a case that the PC 200 receives the recording instruction via an inputting mechanism (a keyboard, a mouse, etc.) of the PC 200, the PC 200 determines whether or not an image quality mode indicated by the recording instruction is a "high image quality mode" (step S1). Step S1 corresponds to a "fourth determining processing" of the present disclosure.

The image quality mode includes a "normal image quality mode" and the "high image quality mode" of which image quality is higher than that of the normal image quality mode. The "normal image quality mode" and the "high image quality mode" have mutually different resolutions of an image. For example, the resolution of the "normal image quality mode" is 600 dpi×300 dpi, and the resolution of the "high image quality mode" is 600 dpi×600 dpi. The normal image quality mode is an exemplary "first quality mode" of the present teaching and the high image quality mode is an exemplary "second quality mode" of the present teaching.

In a case that the PC 200 determines that the image quality mode is the "high image quality mode" (step S1: YES), the PC 200 determines whether or not a recording indicated by the recording instruction is the "double-sided recording" (step S2). Step S2 corresponds to a "first determining processing" of the present disclosure.

The recording includes a "single-sided recording" of recording an image on a front surface (first surface) of the paper sheet P, and the "double-sided recording" of recording an image or images on the surface (first surface) and a rear or back surface (second surface) of the paper sheet P. The term "front surface of the paper sheet P" means a surface, of the paper sheet P, which faces or is opposite to the head 10 in a case that the paper sheet P firstly passes a location below the head 10. The term "rear surface of the paper sheet P" is a surface, of the paper sheet P, which is on the opposite side to the front surface and which faces or is opposite to the head 10 in a case that the paper sheet P passes the location below the head 10 after the recording of the image has been performed on the front surface of the paper sheet P.

In a case that the PC 200 determines that the recording is not the "double-sided recording" (namely, is the "single-sided recording) (step S2: NO), the PC 200 determines whether or not the recording indicated by the recording instruction is a barcode recording (step S3). Step S3 corresponds to a "third determining processing" of the present disclosure.

The recording includes the "barcode recording" of recording an image of a barcode and a "non-barcode recording" of recording an image which is different from the image of the barcode, in addition to the "single-sided recording" and the "double-sided recording" as described above. The barcode displays or represents information by a combination of a part having a high optical reflectance and a part having a low optical reflectance as defined by JIS x 500; the barcode is a generic name of an information carrier which is machine-readable, and includes a one-dimensional symbol and a two-dimensional symbol such as QR Code ("QR Code" is a registered trademark of DENSO WAVE INCORPORATED).

In a case that the PC 200 determines that the recording is not the "barcode recording" (namely, is the "non-barcode recording) (step S3: NO), the PC 200 determines whether or not an discharge mode indicated by the recording instruction is a reduced discharge mode (step S4). Step S4 corresponds to a "second determining processing" of the present disclosure.

The discharge mode includes a "normal discharge mode" and the "reduced discharge mode" of decreasing a discharge amount of the ink with respect to the paper sheet P than that in the normal discharge mode. The normal discharge mode is an exemplary "first discharge mode" of the present teaching and the reduced discharge mode is an exemplary "second discharge mode" of the present teaching.

In a case that the PC 200 determines that the discharge mode is not the "reduced discharge mode" (namely, is the "normal discharge mode) (step S4: NO), the PC 200 generates the selection signal SIN (including the respective gradation data of "00", "01", "10", "11" as depicted in FIG. 6) based on the image data included in the recording instruction and the image quality mode, etc., determined in steps S1 to S4 (step S5*a*). In the case that the PC 200 determines that the discharge mode is not the "reduced discharge mode" (namely, is the "normal discharge mode") (step S4: NO), the CPU 91 supplies, to the actuator unit 13 by the driver IC 14, a driving signal corresponding to each of the gradation data for each pixel, based on the selection signal SIN generated in step S5*a*.

After step S5*a*, the PC 200 generates group selecting data indicating the driving signal group A (step S6*a*).

In a case that the PC 200 determines that the discharge mode is the "reduced discharge mode" (step S4: YES) and determines that the recording is the "barcode recording" (step S3: YES) or that the recording is the "double-sided recording" (step S2: YES), the PC 200 generates the selection signal SIN (including the respective gradation data "00", "01", "10", "11" as indicated in FIG. 6), based on the image data included in the recording instruction and the image quality mode, etc., determined in step S1 to S4 (step S5*b*). In the case that the PC 200 determines that the discharge mode is the "reduced discharge mode" (step S4: YES), or that the recording is the "barcode recording" (step S3: YES) or that the recording is the "double-sided recording" (step S2: YES), the CPU 91 supplies, to the actuator unit 13, by the driver IC 14, a driving signal corresponding to each of the gradation data for each pixel (a driving signal which is different from the driving signal to be supplied to the actuator unit 13 in a case that the PC 200 determines that the discharge mode is not the "reduced discharge mode" (namely, that the discharge mode is the "normal discharge mode")), based on the selection signal SIN generated in step S5*b*.

After step S5*b*, the PC 200 generates group selecting data indicating the driving signal group B (step S6*b*).

In a case that the PC 200 determines that the discharge mode is not the "high image quality mode" (namely, that the discharge mode is the "normal image quality mode) (step S1: NO), the PC 200 generates the selection signal SIN (including the respective gradation data "00", "01", "10", "11" as indicated in FIG. 6), based on the image data included in the recording instruction and the image quality mode determined in step S1 (step S5*c*).

After step S5*c*, the PC 200 generates group selecting data indicating the driving signal group A (step S6*c*).

The group selecting data generated in each of steps S6*c* to S6*c* is data indicating either one of the driving signal groups A and B is to be selected, and corresponds to "driving signal group selecting data" of the present embodiment.

After step S6*a*, S6*b* or S6*c*, the PC 200 transmits the selection signal SIN and the group selecting data to the controller 90 of the printer 100 (step S7), and ends this routine.

Next, as depicted in FIG. 8, the CPU 91 of the printer 100 firstly determines whether or not the selection signal SIN and the group selectin data are received from the PC 200 (step S21). In a case that the selection signal SIN and the group selectin data are not received from the PC 200 (step S21: NO), the CPU 91 repeats the processing of step S21.

In a case that the CPU 91 determines that the selection signal SIN and the group selectin data are received from the PC 200 (step S21: YES), the CPU 91 executes the recording processing based on the gradation data of the received selection signal SIN and the received group selecting data (step S22), and ends this routine.

In step S22, the recording indicated by the recording instruction (either one of the single-sided recording and the double-sided recording and either one of the barcode recording and the non-barcode recording) is executed in the image quality mode and the discharge mode indicated by the recording instruction. In step S22, the CPU 91 selects the driving signal group A or the driving signal B indicated by the group selecting data received in step S21, and the CPU 91 supplies, to the individual electrode 13*c* by the driver IC 14, the driving signal SIN corresponding to each of the gradation data of the selection signal for each pixel in a certain driving signal group which has been selected between the driving signal group A and the driving signal B (see FIG. 6). In this situation, under the control of the CPU 91, the output circuit 94*a* (see FIG. 3) generates the waveform signal FIRE corresponding to the selected driving signal group and outputs the generated waveform signal FIRE to the transfer circuit 94*a*, and outputs the selection signal SIN received from the PC 200 to the transfer circuit 94*b*. The transfer circuit 94*b* transfers the waveform signal FIRE and the selection signal SIN received from the output circuit 94*a* to the driver IC 14. Namely, in a case that the PC 200 determines that the recording is not the "double-sided recording" (namely, that the recording is the "single-sided recording) (step S2: NO) and in a case that the CPU 91 causes the ink to be discharged from the nozzle N toward the front surface (first surface) of the paper sheet P, the CPU 91 supplies, to the actuator 13 by the driver IC 14, the driving signal corresponding to each of the gradation data for each pixel. In a case that the PC 200 determines that the recording is the "double-sided recording" (step S2: YES), and in each of a case that the CPU 91 causes the ink to be discharged from the nozzle N toward the front surface (first surface) of the paper sheet P and a case that the CPU 91 causes the ink to be discharged from the nozzle N toward the rear surface (second surface) of the paper sheet P, the CPU 91 supplies, to the actuator 13 by the driver IC 14, the driving signal corresponding to each of the gradation data for each pixel. More specifically, in a case that the PC 200 determines that the recording is not the "double-sided recording" (namely, that the recording is the "single-sided recording) (step S2: NO), the output circuit 94*a* outputs the driving signal group A including the waveform data F0 corresponding to the liquid droplet amount of 0 (zero) pl, the waveform data F1 corresponding to the liquid droplet amount of 5 pl, the waveform data F2 corresponding to the liquid droplet amount of 15 μl and the waveform data F3 corresponding to the liquid droplet amount of 30 pl, and outputs the received selection signal SIN to the transfer circuit 94*b*. The transfer circuit 94*b* transfers the waveform signal FIRE and the selection signal SIN received from the output circuit 94*a* to the driver IC 14. The driver IC 14 drives the actuator 13*x* based on the waveform data F0 corresponding to the gradation data "00" so that the liquid droplet amount is made to be 0 (zero) pl, drives the actuator 13*x* based on the waveform data F1 corresponding to the gradation data "01" so that the liquid droplet amount is made to be 5 pl, drives the actuator 13*x* based on the waveform data F2 corresponding to the gradation data "10" so that the liquid droplet amount is made to be 15 pl, and drives the actuator 13*x* based on the waveform data F3 corresponding to the gradation data "11" so that the liquid droplet amount is made to be 30 pl. On the other hand, in a case that the PC 200 determines that the recording is the "double-sided recording" (step S2: YES), the output circuit 94*a* outputs the driving signal group B including the waveform data F0 corresponding to the liquid droplet amount of 0 (zero) pl, the waveform data F1 corresponding to the liquid droplet amount of 5 pl, the waveform data F2' corresponding to the liquid droplet amount of 10 pl and the waveform data F3' corresponding to the liquid droplet amount of 15 pl, and outputs the received selection signal SIN to the transfer circuit 94*b*. The transfer circuit 94*b* transfers the waveform signal FIRE and the selection signal SIN received from the output circuit 94*a* to the driver IC 14. The driver IC 14 drives the actuator 13*x* based on the waveform data F0 corresponding to the gradation data "00" so that the liquid droplet amount is made to be 0 (zero) pl, drives the actuator 13*x* based on the waveform data F1 corresponding to the gradation data "01" so that the liquid droplet amount is made to be 5 pl, drives the actuator 13*x* based on the waveform data F2' corresponding to the gradation data "10" so that the liquid droplet amount is made to be 10 pl, and drives the actuator 13*x* based on the waveform data F3' corresponding to the gradation data "11" so that the liquid droplet amount is made to be 15 pl.

As depicted in FIG. 9, in the "normal image quality mode", the driving signal group A is selected in either one of the "single-sided recording" and the "double-sided recording", in either one of the "barcode recording" and the "non-barcode recording" and in either one of the "normal discharge mode" and the "reduced discharge mode". In the "high image quality mode", the driving signal group A is selected in a case of the "single-sided recording", the "non-barcode recording" and the "normal discharge mode". In the "high image quality mode", the driving signal group B is selected in a case of the "single-sided recording", the "non-barcode recording" and the "reduced discharge mode". In the "high image quality mode", the driving signal group B is selected in a case of the "single-sided recording" and the "barcode recording". In the "high image quality mode", the driving signal group B is selected in a case of the "double-sided recording".

In the "double-sided recording", the selected driving signal group A or B is used at each of the time of discharging the ink to the front surface of the paper sheet P and the time of discharging the ink to the rear surface of the paper sheet P.

The driving signal group A corresponds to a "first driving signal group", a "third driving signal group" and a "fifth driving signal group" of the present disclosure. The driving signal group B corresponds to a "second driving signal group", a "fourth driving signal group" and a "sixth driving signal group" of the present disclosure.

As described above, according to the present disclosure, the driving signal group B used in the "double-sided recording" (the high image quality mode) has the liquid droplet amount of the waveform data F2' of "medium" and the liquid droplet amount of the waveform data F3' of "large" which are small as compared with those of the driving signal group A used in the "single-sided recording" (the high image quality mode, the non-barcode recording, and the normal discharge mode) (see FIGS. 4A to 4D, FIGS. 5A to 5D, FIG. 6 and FIG. 9). Namely, at the time of the double-sided recording, the ink in the liquid droplet amount which is not same as but is smaller than that of the single-sided recording is discharged in accordance with the gradation value with respect to each of the front surface and the rear surface of the paper sheet P. With this, it is possible to suppress the bleed-through at the time of the double-sided recording. Further, at the time of the single-sided recording, the ink in the liquid droplet amount which is not same as but is greater than that with respect to each of the front surface and the rear surface of the paper sheet P at the time of the double-sided recording is discharged in accordance with the gradation value with respect to the front surface of the paper sheet P. With this, it is possible to suppress the degradation of the color development at the time of the single-sided recording.

Between the driving signal group A and the driving signal group B, the waveform data of "medium" and the waveform data of "large" are made to be mutually different, rather than the waveform data of "small". In such a manner, by making the liquid droplet amount of "medium" and the liquid droplet amount of "large" of which liquid droplets amounts are relatively large to be mutually different between the driving signal group A and the driving signal group B, the above-described effect (the effect of suppressing both of the bleed-through at the time of the double-sided recording and the degradation of the color development at the time of the single-sided recording) can be obtained in a more ensured manner.

Between the driving signal group A and the driving signal group B, not only the waveform data of "large", but also the waveform data of "medium" are made to be mutually different. With this, it is possible to make the change in the liquid droplet amount in each of the driving signal groups A and B to be different in a stepped manner, thereby making it possible to make the graininess of an image to be satisfactory (to suppress the roughness of an image).

The driving signal group B used in the "reduced discharge mode" has the liquid droplet amount of the waveform data F2' of "medium" and the liquid droplet amount of the waveform data F3' of "large" which are small as compared with those of the driving signal group A used in the "normal discharge mode" (see FIGS. 4A to 4D, FIGS. 5A to 5D, FIG. 6 and FIG. 9). Namely, in the reduced discharge mode, the ink in the liquid droplet amount which is smaller than that of the normal discharge mode is discharged in accordance with the gradation value. With this, it is possible to suppress any swelling of the paper sheet P (and consequently, to suppress such a problem that the paper sheet P which is curved due to the swelling makes contact with the lower surface of the head 10 to thereby cause the ink to adhere to the paper sheet P, and/or that such a problem of occurrence of any jam of the paper sheet P).

The driving signal group B used in the "barcode recording" has the liquid droplet amount of the waveform data F2' of "medium" and the liquid droplet amount of the waveform data F3' of "large" which are small as compared with those of the driving signal group A used in the "non-barcode recording" (normal discharge mode) (see FIGS. 4A to 4D, FIGS. 5A to 5D, FIG. 6 and FIG. 9). Namely, at the time of the barcode recording, the ink in the liquid droplet amount which is smaller than that at the time of the non-barcode recording is discharged in accordance with the gradation value. With this, it is possible to suppress any bleeding in an edge of the barcode. Further, even in such a case that any bleeding occurs in the edge of the barcode, it is possible to suppress the extent of the bleeding and also to suppress any reading error of the barcode.

The driving signal group B is used in the "barcode recording" and the "reduced discharge mode" (see FIG. 9). By using the same driving signal group in such a manner, it is possible to suppress the data amount regarding the driving signal group and to suppress the amount of memory.

The driving signal group A is used in the case of the "high image quality mode" and the "single-sided recording" (the non-barcode recording, the normal discharge mode), and in the case of the "normal image quality mode" (see FIG. 9). By using the same driving signal group in such a manner, it is possible to suppress the data amount regarding the driving signal group and to suppress the amount of memory.

Between the driving signal group A and the driving signal group B, the waveform data F1 of "small" is mutually same (see FIG. 6). In such a case that the liquid droplet is made to be further smaller regarding the "small", the color development is degraded. Further, in such a case that between the driving signal group A and the driving signal group B, the waveform data "small" is made to be also different, in addition to that the waveform data "medium" and the waveform data of "large" are made to be different, the data amount regarding the driving signal group becomes great, and thus it is hard to suppress the amount of memory. Furthermore, regarding the liquid droplet amount "small", the problem of the bleed-through hardly occurs, after all. In the present embodiment, the waveform data "small" is made to be same between the driving signal group A and the driving signal group B, based on these points of view. With this, it is possible to realize both of the suppression of bleed-through and suppression of the degradation of color development, and the suppression of the data amount.

The PC 200 performs the determination regarding the double-sided recording (step S2), the generation of the gradation data (step S5*a* to S5*c*) and the generation of the group selecting data (steps S6*a* to S6*c*). In this case, there is no need to perform the determination and the generations of data on the side of the printer 100, thereby making it possible to simplify the electric structure of the printer 100.

The number of the gradation value is "4 (four)" (four kinds of the liquid droplet amount: zero, small, medium and large), and the gradation data is constructed of 2 bits ("00", "01", "10", "11") (see FIGS. 6A to 6D). In a case that the number of the gradation value is "5 (five)" (five kinds of the liquid droplet amount: zero, small, medium, large and extra-large), the gradation data corresponding to the "extra-large" is constructed of 3 bits ("100") and the data amount becomes numerous, which in turn lowers the transfer speed of the data to the driver IC 14. In view of this, in the present embodiment, the gradation data is constructed of 2 bits, thereby making it possible to suppress any lowering in the data transfer speed. Note that in the printer 100 which is capable of discharging the ink in the four kinds of the liquid droplet amount, even in a case that the gradation data is constructed of 2 bits, the driving signal group A and the driving signal group B are selectively used, thereby making it possible to change the liquid droplet amount between the single-sided recording and the double-sided recording. As described above, the driving signal group A including the waveform data F0 corresponding to the liquid droplet amount of 0 pl, the waveform data F1 corresponding to the liquid droplet amount of 5 pl, the waveform data F2 corresponding to the liquid droplet amount of 15 μl and the waveform data F3 corresponding to the liquid droplet amount of 30 pl is used in the case of the single-sided recording. On the other hand, the driving signal group B including the waveform data F0 corresponding to the liquid droplet amount of 0 pl, the waveform data F1 corresponding to the liquid droplet amount of 5 pl, the waveform data F2' corresponding to the liquid droplet amount of 10 μl and the waveform data F3' corresponding to the liquid droplet amount of 15 pl is used in the case of the double-sided recording. By selectively using the driving signal group A and the driving signal group B in such a manner, even in a case of the same gradation data of "10", the liquid droplet amount becomes 15 pl by using the driving signal group A, and the liquid droplet amount becomes 10 pl by using the driving signal group B. In a case that the prevention of bleed-through is desired and regarding the gradation data of "10", the liquid droplet amount can be reduced by 5 pl per each pixel, and the bleed-through can be prevented easily. Further, by selectively using the driving signal group A and the driving signal group B, even in a case of the same gradation data of "11", the liquid droplet amount becomes 30 pl by using the driving signal group A, and the liquid droplet amount becomes 15 pl by using the driving signal group B. In a case that the prevention of bleed-through is desired and regarding the gradation data of “11”, the liquid droplet amount can be reduced by 15 pl per each pixel, and the bleed-through can be prevented more easily, than in the case of the gradation data of “10”. In such a manner, according to the present embodiment, it is possible to suppress the lowering in the data transfer speed, while preventing the bleed-through.

Second Embodiment

Next, a second embodiment of the present disclosure will be explained, with reference to FIGS. 10A and 10B.

The second embodiment is similar to the first embodiment, except that the determination regarding the double-sided recording, etc., (steps S1 to S4), the generation of the gradation data (steps S5*a* to S5*c*) and the generation of the group selecting data (step S6*a* to S6*c*) are performed by the printer 100, rather than by the PC 200.

Figure 10A:
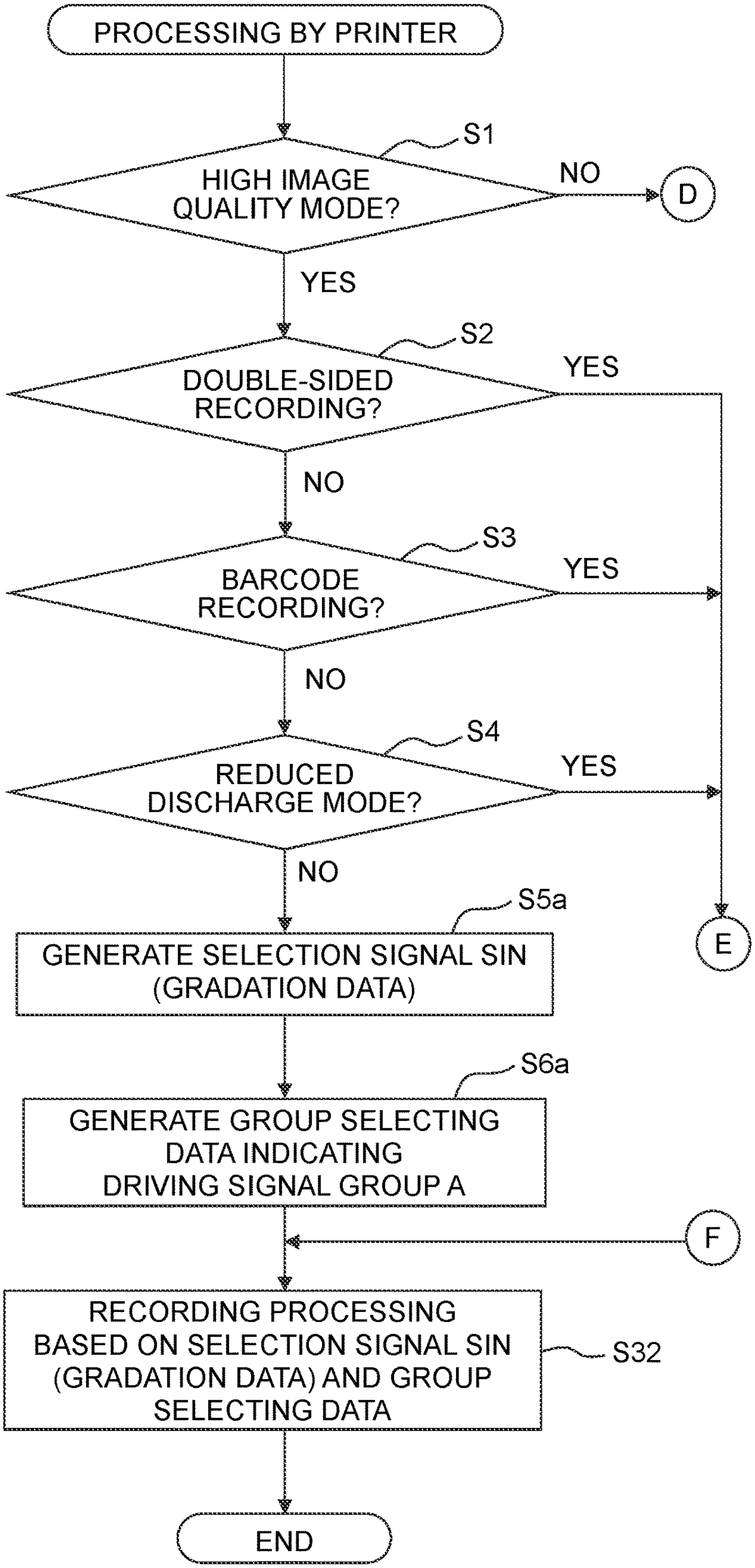
FIGS. 10A and 10B are a flow chart indicating a processing executed by a CPU of a printer according to a second embodiment of the present disclosure.
Figure 10B:
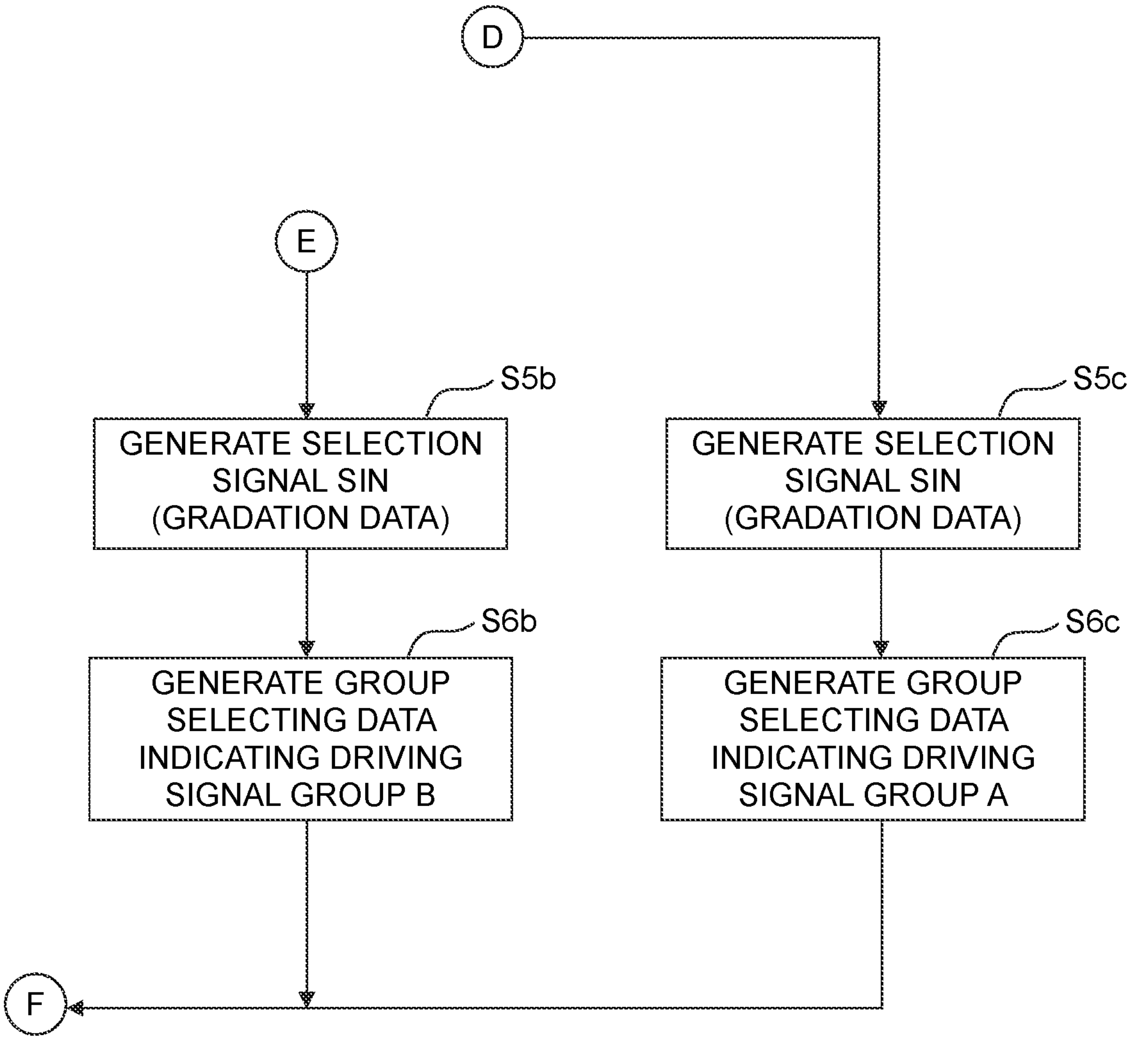

In a case that the CPU 91 of the printer 100 receives a recording instruction from an external apparatus (the PC 200, an external memory connected to the printer 100, etc.), the CPU 91 executes a processing of each of steps S1 to S6*c*, which are similar to those in the first embodiment, as depicted in FIGS. 10A and 10B. After step S6*a*, S6*b* or S6*c*, the CPU 91 executes the recording processing based on the gradation data of the selection signal SIN generated in the step S5*a*, S5*b* or S5*c* and based on the group selecting data generated in step S6*a*, S6*b* or S6*c* (step S32), and ends this routine.

The second embodiment is applicable to a media print of executing image recording by connecting the external memory to the printer 100, not via the PC 200.

Modifications

Although the embodiments of the present disclosure have been explained in the foregoing, the present disclosure is not limited to or restricted by the above-described embodiments, and various design changes can be made within the scope of the claims.

For example, in the embodiment as described above (see FIGS. 7A and 7B), in a case of the normal image quality mode (step S1: NO), the determinations regarding the double-sided recording, the barcode recording and the reduced discharge mode are not performed. It is allowable, however, to perform the determinations regarding the double-sided recording, etc., also in a case of the normal image quality mode, and to select the driving signal group depending of the results of the determinations. Similarly, in the embodiment as described above (see FIGS. 7A and 7B), in a case of the double-sided recording (step S2: YES), the determinations regarding the barcode recording and the reduced discharge mode are not performed. It is allowable, however, to perform the determinations regarding the barcode recording, etc., also in a case of the double-sided recording, and to select the driving signal group depending of the results of the determinations. In this case, for example, regarding a case of the double-sided recording and the barcode recording and/or the reduced discharge mode, it is allowable to select the driving signal group in which the liquid droplet amount is small as compared with a case of the single-sided recording and the barcode recording and/or the reduced discharge mode.

In the above-described embodiment (see FIGS. 5C and 5D), although the liquid droplet amount is made to be small by making the width W of the final pulse to be small, the present disclosure is not limited to this. For example, it is allowable to make the liquid droplet amount to be small by making a width of each of a plurality of pulses to be small, or by making the number of pulses to be small.

In the above-described embodiment, although the liquid in a liquid droplet amount selected among the four kinds of the liquid droplet amount (zero, small, medium and large) is discharged toward the recording medium in the recording processing, the present disclosure is not limited to this. For example, it is allowable to discharge the liquid in a liquid droplet amount selected among three kinds of the liquid droplet amount (zero, small, and large) toward the recording medium in the recording processing; alternatively, it is allowable to discharge the liquid in a liquid droplet amount selected among not less than five kinds of the liquid droplet amount (zero, small, medium, large and extra-large) toward the recording medium in the recording processing. Namely, although the number of the gradation value is “4 (four)” in the above-described embodiment, the number of the gradation value may be “3 (three)” or “not less than 5 (five)”.

In the above-described embodiment, the waveform data of “medium” and the waveform data of “large” are made to be different between the driving signal group A (see FIG. 4A to 4D) and the driving signal group B (see FIG. 5A to 5D). The present disclosure, however, is not limited to this. For example, it is allowable to make one of the waveform data of “medium” and the waveform data of “large” to be different between the driving signal group A and the driving signal group B, and to make one of the waveform data of “medium” and the waveform data of “large” of the driving signal group B to correspond to a liquid droplet amount which is smaller than one of the waveform data of “medium” and the waveform data of “large” of the driving signal group A. Alternatively, it is allowable to make the waveform data of “small” to be different between the driving signal group A and the driving signal group B, and to make the waveform data of “small” of the driving signal group B to correspond to a liquid droplet amount which is smaller than the waveform data of “small” of the driving signal group A.

In the above-described embodiment, the driving signal group is made to be different not only between the single-sided recording and the double-sided recording, but also depending on the image quality mode, the discharge mode, the presence or absence of the barcode recording, etc. The present disclosure, however, is not limited to this. For example, it is allowable to make the driving signal group is made to be different between the single-sided recording and the double-sided recording, but not depending on the image quality mode, the discharge mode, the presence or absence of the barcode recording, etc.

The actuator is not limited to being of the piezoelectric system, and may be of another system (for example, a thermal system using a heating element, an electrostatic system using a electrostatic force, etc.).

Although the head in the above-described embodiment is of the serial system, the head may be of the line system.

The liquid discharged from the nozzles is not limited to the ink, and may be a liquid which is different from the ink (e.g., a treatment liquid which agglutinates or precipitates a constituent or component of ink, etc.).

The recording medium is not limited to the paper sheet (paper), and may, for example, be a cloth, a resin member, etc.

The present disclosure is also applicable to facsimiles, copy machines, multifunction peripherals, etc. without limited to printers. The present disclosure is also applicable to a liquid discharge apparatus used for any other application than the image recording (e.g., a liquid discharge apparatus which forms an electroconductive pattern by discharging an electroconductive liquid on a substrate).

The program according to the present disclosure is distributable by being recorded or stored on a removable-type recording medium such as a flexible disk, etc., and on a fixed-type recording medium such as a hard disk, etc., and is also distributable via a telecommunication line.

What is claimed is:

1. A liquid discharging apparatus comprising:

a channel unit in which a nozzle and an individual channel communicating with the nozzle are formed;

an actuator configured to apply pressure to liquid in the individual channel to discharge the liquid from the nozzle;

a driving circuit electrically connected to the actuator and configured to supply a driving signal to the actuator; and a controller, wherein in a first determining processing, in a case of determining that a single-sided recording is to be executed, the controller is configured to supply the driving signal corresponding to each of gradation values for each of pixels to the actuator by the driving circuit at a time of discharging the liquid from the nozzle toward one of a first surface and a second surface of a recording medium, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium, in a case of determining in the first determining processing that the double-sided recording is to be executed, the controller is configured to supply the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording, a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value, and the at least three gradation values include the first gradation value and a second gradation value corresponding to an amount of the liquid which is smaller than an amount corresponding to the first gradation value, wherein a driving signal which is included in the driving signals constructing the second driving signal group and which corresponds to the second gradation value corresponds to an amount of the liquid smaller than an amount of the liquid to be discharged by a driving signal which is included in the driving signals constructing the first driving signal group and which corresponds to the second gradation value, in a second determining processing, in a case of determining that a discharge mode is to be a first discharge mode, the controller is further configured to execute a first discharging processing of supplying the driving signal corresponding to each of the gradation values to the actuator by the driving circuit for each of the pixels, the second determining processing being a processing of determining whether the discharge mode is the first discharging mode or a second discharge mode of decreasing discharge amount of the liquid with respect to the recording medium than that in the first discharge mode, in a case of determining in the second determining processing that the discharge mode is to be the second discharge mode, the controller is further configured to execute a second discharging processing of supplying the driving signal corresponding to each of gradation values to the actuator by the driving circuit for each of the pixels, the driving signal groups include a third driving signal group used in the first discharging processing and a fourth driving signal group used in the second discharging processing, and a driving signal which is included in driving signals constructing the fourth driving signal group and which corresponds to a fourth gradation value as one of the gradation values corresponds to an amount of the liquid smaller than an amount of the liquid to be discharged by a driving signal which is included in driving signals constructing the third driving signal group and which corresponds to the fourth gradation value.

2. The liquid discharging apparatus according to claim 1 wherein in a third determining processing, in a case of determining that a non-barcode recording is to be executed, the controller is further configured to supply the driving signal corresponding to each of the gradation values to the actuator by the driving circuit for each of the pixels, the third determining processing being a processing of determining whether a barcode recording or the non-barcode recording is to be executed, in a case of determining in the third determining processing that the barcode recording is to be executed, the controller is further configured to supply the driving signal corresponding to each of the gradation values to the actuator by the driving circuit for each of the pixels, the driving signal groups include a fifth driving signal group used in the non-barcode recording and the fourth driving signal group used in the barcode recording, and a driving signal which is included in driving signals constructing the fifth driving signal group and which corresponds to the fourth gradation value corresponds to an amount of the liquid greater than an amount of the liquid to be discharged by a driving signal which is included in the driving signals constructing the fourth driving signal group and which corresponds to the fourth gradation value.

3. The liquid discharging apparatus according to claim 1, wherein the first determining processing, generation of gradation data indicating the gradation values, and generation of driving signal group selecting data indicating which one of the driving signal groups is to be selected are executed by an external apparatus communicably connected to the liquid discharging apparatus, and the controller is configured to execute either one of the single-sided recording and the double-sided recording, based on the gradation data and the driving signal group selecting data received from the external apparatus.

4. The liquid discharging apparatus according to claim 3, wherein the controller is configured to transfer the gradation data to the driving circuit, and the gradation data is constructed of 2 bits.

5. The liquid discharging apparatus according to claim 1, wherein the controller is configured to execute the first determining processing, generation of gradation data indicating the gradation values, and generation of driving signal group selecting data indicating which one of the driving signal groups is to be selected, and the controller is configured to execute either one of the single-sided recording and the double-sided recording, based on the gradation data and the driving signal group selecting data.

6. A liquid discharging apparatus comprising:

a channel unit in which a nozzle and an individual channel communicating with the nozzle are formed;

an actuator configured to apply pressure to liquid in the individual channel to discharge the liquid from the nozzle;

a driving circuit electrically connected to the actuator and configured to supply a driving signal to the actuator; and a controller, wherein in a first determining processing, in a case of determining that a single-sided recording is to be executed, the controller is configured to supply the driving signal corresponding to each of gradation values for each of pixels to the actuator by the driving circuit at a time of discharging the liquid from the nozzle toward one of a first surface and a second surface of a recording medium, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium, in a case of determining in the first determining processing that the double-sided recording is to be executed, the controller is configured to supply the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording, a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value, and the at least three gradation values include the first gradation value and a second gradation value corresponding to an amount of the liquid which is smaller than an amount corresponding to the first gradation value, wherein in a second determining processing, in a case of determining that a non-barcode recording is to be executed, the controller is further configured to supply the driving signal corresponding to each of the gradation values to the actuator by the driving circuit for each of the pixels, the second determining processing being a processing of determining whether a barcode recording or the non-barcode recording is to be executed, in a case of determining in the second determining processing that the barcode recording is to be executed, the controller is further configured to supply the driving signal corresponding to each of the gradation values to the actuator by the driving circuit for each of the pixels, the driving signal groups include a fifth driving signal group used in the non-barcode recording and a sixth driving signal group used in the barcode recording, and a driving signal which is included in driving signals constructing the sixth driving signal group and which corresponds to a fifth gradation value as one of the gradation values corresponds to an amount of the liquid smaller than an amount of the liquid to be discharged by a driving signal which is included in driving signals constructing the fifth driving signal group and which corresponds to the fifth gradation value.

7. A liquid discharging apparatus comprising:

a channel unit in which a nozzle and an individual channel communicating with the nozzle are formed;

an actuator configured to apply pressure to liquid in the individual channel to discharge the liquid from the nozzle;

a driving circuit electrically connected to the actuator and configured to supply a driving signal to the actuator; and a controller, wherein in a first determining processing, in a case of determining that a single-sided recording is to be executed, the controller is configured to supply the driving signal corresponding to each of gradation values for each of pixels to the actuator by the driving circuit at a time of discharging the liquid from the nozzle toward one of a first surface and a second surface of a recording medium, the first determining processing being a processing of determining whether the single-sided recording or a double-sided recording is to be executed, the single-sided recording being of recording an image on one of the first surface and the second surface of the recording medium, the second surface being on a side opposite to the first surface, and the double-sided recording being of recording an image or images on both of the first surface and the second surface of the recording medium, in a case of determining in the first determining processing that the double-sided recording is to be executed, the controller is configured to supply the driving signal corresponding to each of the gradation values for each of the pixels to the actuator by the driving circuit at a time of discharging the liquid from the nozzle toward the first surface of the recording medium and at a time of discharging the liquid from the nozzle toward the second surface of the recording medium, the driving signal is provided as a plurality of driving signals constructing a plurality of driving signal groups each of which is composed of at least three driving signals corresponding, respectively, to at least three gradation values including a first gradation value, the driving signal groups include a first driving signal group used in the single-sided recording and a second driving signal group used in the double-sided recording, a driving signal which is included in driving signals constructing the second driving signal group and which corresponds to the first gradation value corresponds to an amount of the liquid smaller than an amount of the liquid to be discharged by a driving signal which is included in driving signals constructing the first driving signal group and which corresponds to the first gradation value, and the at least three gradation values include the first gradation value and a second gradation value corresponding to an amount of the liquid which is smaller than an amount corresponding to the first gradation value, wherein in a case of determining that an image quality mode is to be a second quality mode in a fourth determining processing and determining that the single-sided recording is to be executed in the first determining processing, the controller is further configured to supply the driving signal corresponding to each of the gradation values to the actuator by the driving circuit for each of the pixels at a time of discharging the liquid from the nozzle toward one of the first surface and the second surface of the recording medium, the fourth determining processing being a processing of determining whether the image quality mode is a first quality mode or the second quality mode having a quality of the image to be recorded on the recording medium higher than that of the first quality mode, in a case of determining in the fourth determining processing that the image quality mode is to be the first quality mode, the controller is further configured to supply the driving signal corresponding to each of gradation values to the actuator by the driving circuit for each of the pixels, and in a case of the second quality mode and the single-sided recording and in the case of the first quality mode, the controller is configured to use the first driving signal group.

* * * * *